(12) United States Patent
Olsen et al.

(10) Patent No.: US 7,146,336 B2
(45) Date of Patent: Dec. 5, 2006

(54) CURRENCY TRADING SYSTEM, METHODS, AND SOFTWARE

(75) Inventors: Richard B. Olsen, Zurich (CH); Michael Stumm, Toronto (CA)

(73) Assignee: Oanda Corporation, Toronto (CA)

( * ) Notice: Subject to any disclaimer, the term of this patent is extended or adjusted under 35 U.S.C. 154(b) by 673 days.

(21) Appl. No.: 09/858,610

(22) Filed: May 16, 2001

(65) Prior Publication Data

US 2002/0156718 A1 Oct. 24, 2002

Related U.S. Application Data

(60) Provisional application No. 60/274,174, filed on Mar. 8, 2001.

(51) Int. Cl.
*G06Q 40/00* (2006.01)
(52) U.S. Cl. .......................... 705/37; 705/35
(58) Field of Classification Search .................. 705/35, 705/37, 1
See application file for complete search history.

(56) References Cited

U.S. PATENT DOCUMENTS 5,787,402 A * 7/1998 Potter et al. .................. 705/37
5,916,307 A * 6/1999 Piskiel et al. ................ 709/314
6,199,046 B1 * 3/2001 Heinzle et al. ................ 705/1
2001/0044771 A1 * 11/2001 Usher et al. ................... 705/37
2001/0049651 A1 * 12/2001 Selleck ......................... 705/37
2001/0056398 A1 * 12/2001 Scheirer ....................... 705/38
2002/0023053 A1 * 2/2002 Szoc et al. .................... 705/39
2002/0087455 A1 * 7/2002 Tsagarakis et al. ........... 705/37
2003/0115128 A1 * 6/2003 Lange et al. .................. 705/37
2003/0159109 A1 * 8/2003 Rossmann et al. .......... 715/513

* cited by examiner

*Primary Examiner*—Alain L. Bashore
(74) *Attorney, Agent, or Firm*—Morgan, Lewis & Bockius LLP

(57) ABSTRACT

In one aspect, the present invention comprises a system for trading currencies over a computer network. A preferred embodiment comprises: (a) a server front-end; (b) at least one database; (c) a transaction server; (d) a rate server; (e) a pricing engine; (f) an interest rate manager; (g) a trade manager; (h) a value at risk server; (i) a margin control manager; (j) a trading system monitor; and (k) a hedging engine. In another aspect, the present invention comprises methods for trading currency over a computer network. In another aspect, the present invention comprises software for currency trading over a computer network.

11 Claims, 14 Drawing Sheets

Fig. 6

ACCOUNT SUMMARY

| | |
|---|---|
| Balance | 100,000.00 |
| Total Profits | -22.00 |
| Margin Used | 7,676.10 |
| Margin Available | 92,301.90 |

Fig. 7

OPEN TRADES

| | TICKET | CURR | UNITS | S/L | T/P | PRICE | MARKET | PROFIT |
|---|---|---|---|---|---|---|---|---|
| S | 33760 | USD/CHF | 100000 | | | 1.7415 | 1.7413 | 0.0002 |
| S | 33759 | EUR/USD | 85000 | 0.8715 | 0.8668 | 0.8689 | 0.8692 | -0.0003 |

Fig. 8

| OPEN POSITIONS | | | | | |
|---|---|---|---|---|---|
| | CURR | UNITS | AVG. PRICE | MARKET | PROFIT |
| S | USD/CHF | 100000 | 1.7415 | 1.7407 | 0.0008 |
| S | EUR/USD | 65000 | 0.8689 | 0.8697 | -0.0008 |

Fig. 9

| OPEN ORDERS | | | | | | |
|---|---|---|---|---|---|---|
| ORDER | CURR | UNITS | S/L | T/P | PRICE | MARKET | DURATION |
| B | 245 | EUR/JPY | 200000 | 93.203 | 93.789 | 93.512 | 93.509 | Undefined |

Recent History

| TRANSACTION | TYPE | CURR | UNITS | PRICE | DATE/TIME |
|---|---|---|---|---|---|
| 56958 | Buy Market | EUR/USD | 10000 | 0.8684 | Oct 9, 2000, 16:42 |
| 56959 | Buy Market | GBP/USD | 100000 | 1.4486 | Oct 9, 2000, 16:43 |
| 57001 | Take Profit | GBP/USD | 100000 | 1.4604 | Oct 11, 2000, 12:38 |
| 57021 | Buy Market | EUR/USD | 25000 | 0.8688 | Oct 11, 2000, 15:04 |
| 57022 | Sell Market | EUR/USD | 25000 | 0.8689 | Oct 11, 2000, 15:07 |

Fig. 10

| CURRENT RATES | |
|---|---|
| EUR/USD | 0.8545 / 46 |
| GBP/USD | 1.4515 / 18 |
| USD/JPY | 107.66 / 68 |
| USD/CHF | 1.7663 / 67 |
| USD/CAD | 1.5070 / 74 |
| EUR/GBP | 0.5890 / 92 |
| EUR/JPY | 92.230 / 49 |

Fig. 11

CURRENCY TRADING SYSTEM, METHODS, AND SOFTWARE

CROSS-REFERENCE TO RELATED APPLICATION

This application claims priority to U.S. provisional application No. 60/274,174, filed Mar. 8, 2001, and incorporates the entire contents thereof herein by reference.

FIELD OF THE INVENTION

The present invention is related to currency trading; more particularly, the invention is related to trading currency over a computer network.

BACKGROUND

In a traditional on-line currency market, a trade occurs through three steps: (1) the trader specifies to a dealer the currency pair and the amount that he would to trade (but does not specify whether he would like to buy or sell); (2) the dealer specifies to the trader both a bid and an ask price and gives the trader several seconds to respond (the dealer not knowing whether the trader will buy, sell, or reject the offer); and (3) the trader either rejects the offer or specifies whether he is buying or selling (his response must occur within a time frame of a few seconds).

But performing such a three-way handshake over the Internet is somewhat impractical because of Internet delays: the trader might not actually have a few seconds to respond before the dealer withdraws the offer. Thus, there is a need for a system and method of on-line currency trading that is based on a trading model that is superior to the three-way handshake described above.

Another problem is that many corporations have firewalls that restrict access to the corporate network, and that typically restrict access to the Internet (and to well-known services such as email, the World Wide Web, etc.) from within the corporation. This inhibits the ability of on-line trading systems to access information from and transfer information to users behind corporate firewalls.

SUMMARY

The present invention overcomes the above-described and other disadvantages of previous currency trading systems and methods. In one aspect, the present invention comprises a system for trading currencies over a computer network. A preferred embodiment comprises: (a) a server front-end; (b) at least one database; (c) a transaction server; (d) a rate server; (e) a pricing engine; (f) an interest rate manager; (g) a trade manager; (h) a value at risk server; (i) a margin control manager; (j) a trading system monitor; and (k) a hedging engine. Each of these components is described in detail below in the Detailed Description section.

In another aspect, the present invention comprises methods for trading currency over a computer network. In one embodiment, a preferred method comprises: (a) transmitting currency market information over a computer network to an end user; (b) receiving a currency trade order from the end user, wherein the currency trade order comprises limits within which the currency trade will be acceptable to the end user; (c) calculating a market exchange rate for the currency trade order; and (d) executing the order if the market exchange rate is within the specified limits.

In another embodiment, a preferred method comprises: (a) transmitting currency market information over a computer network to an end user; (b) receiving a currency trade order from the end user, wherein the currency trade order comprises a threshold exchange rate; (c) calculating a market exchange rate for the received currency trade order; and (d) executing the order (1) if the market exchange rate is or goes above the threshold exchange rate and the order is a sell order, and (2) if the market exchange rate is or goes below the threshold exchange rate and the order is a buy order.

In a further embodiment, a preferred method comprises: (a) receiving currency market information over a computer network from a trading system server; (b) transmitting a currency trade order to the trading system server, wherein the currency trade order comprises limits within which the currency trade will be acceptable; and (c) if a market exchange rate is within the specified limits, receiving information from the trading system server indicating that the currency trade order was executed.

In another embodiment, a preferred method comprises: (a) receiving currency market information over a computer network from a trading system server; (b) transmitting a currency trade order to the trading system server, wherein the currency trade order comprises a threshold exchange rate; and (c) if (1) the applicable market exchange rate is or goes above the threshold exchange rate and the order is a sell order, or (2) the applicable market exchange rate is or becomes below the threshold exchange rate and the order is a buy order, receiving information from the trading system server indicating that the currency trade order was executed.

In another aspect, the present invention comprises software for currency trading over a computer network. In one embodiment, preferred software comprises: (a) software for receiving data over a computer network from a trading system server; (b) software for displaying a first graphical user interface display that: (i) displays continuously updated currency exchange rates in real-time based on data received from the trading system server; and (ii) displays action buttons, including a buy/sell button; (c) software for displaying, in response to a user clicking the buy/sell action button, a buy/sell window display that: (i) comprises trade order parameter fields; and (ii) accepts trade order data entered into the trade order parameter fields by a user; and (d) software for transmitting said trade order data to said trading system server over said computer network.

BRIEF DESCRIPTION OF THE DRAWINGS

FIG. 6 depicts an account summary table display.
FIG. 7 depicts an open trades table display.
FIG. 8 depicts an open positions table display.
FIG. 9 depicts an open orders table display.
FIG. 10 depicts a transactions table display.
FIG. 11 depicts a currency rates table display.

DETAILED DESCRIPTION OF PREFERRED EMBODIMENTS

The Currency Trading System of a preferred embodiment (hereinafter "Trading System") of the present invention allows traders to trade currencies over a computer network. Preferably, this computer network is the Internet, and the subsequent description herein is primarily in terms of the Internet. However, those skilled in the art will recognize that the following description also applies to other computer networks. Traders interface to the system using ordinary Web browsers running feature-rich Java applets; they obtain real-time data feeds of current exchange rates, they can analyze past exchange rates using graphical tools, they can review their current portfolio and past trades, and they can place buy and sell orders in the real-time market. Businesses interface to the system using an API. Innovative features that set the Trading System apart from the competition are: (i) extremely low spreads on the order of a few basis points, (ii) the ability to trade very small amounts as low as $1, and (iii) 24 hour a day, 7 days a week availability. This system has the potential to revolutionize the way currency trading is done and to open up currency trading to a new, large market segment of investors and speculators for whom currency trading is not feasible today. Moreover, it allows businesses to address their currency exchange requirements in the most cost-effective and efficient way.

A description of the preferred server infrastructure used in the Trading System follows. We first give a brief introduction of the system as a whole.

Figure 1:
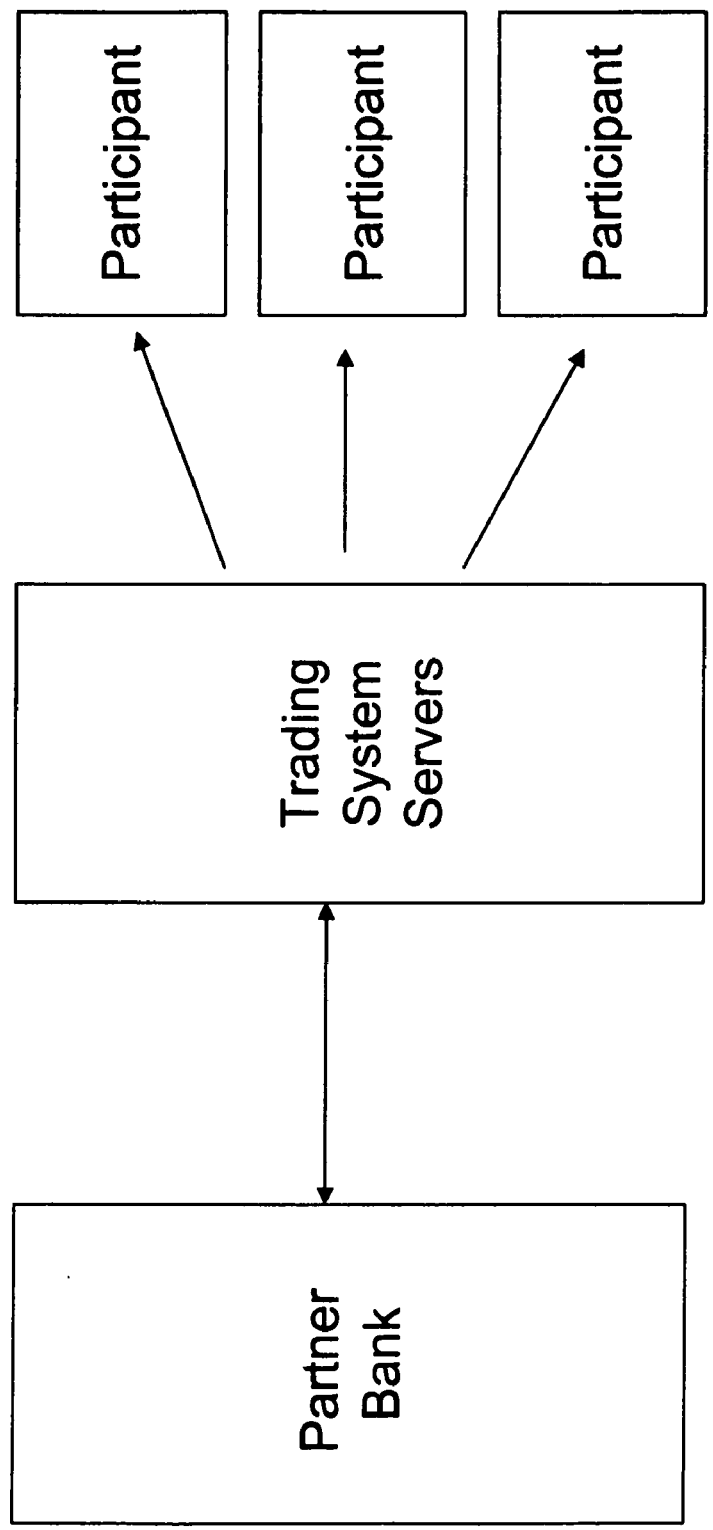
FIG. 1 depicts parties involved in a preferred embodiment.

The Trading System involves three components (see FIG. 1): (1) traders that are distributed around the world; (2) Trading System servers; and (3) "Partners" consisting of the financial institution(s) through which real currency exchange trades are executed, and from which real-time data feeds are obtained.

Traders communicate with Trading System servers over a secure, encrypted Internet connection to review their accounts, to monitor currency exchange market conditions, or to initiate currency exchange trades. The Trading System servers are preferably connected to the partners' back-office systems, using direct, private lines.

A trader trades with the Trading System similar to the way she currently trades with a broker, except that the trading is over the Web, occurs 24 hours a day, 7 days a week, and allows very small trades with very low spreads. Moreover, an initial deposit, which may be as low as $20, can be charged to a credit card to get started. Alternatively, the trader can transfer initial funds directly to the Partner bank to be credited to her Trading System account.

Figure 2:
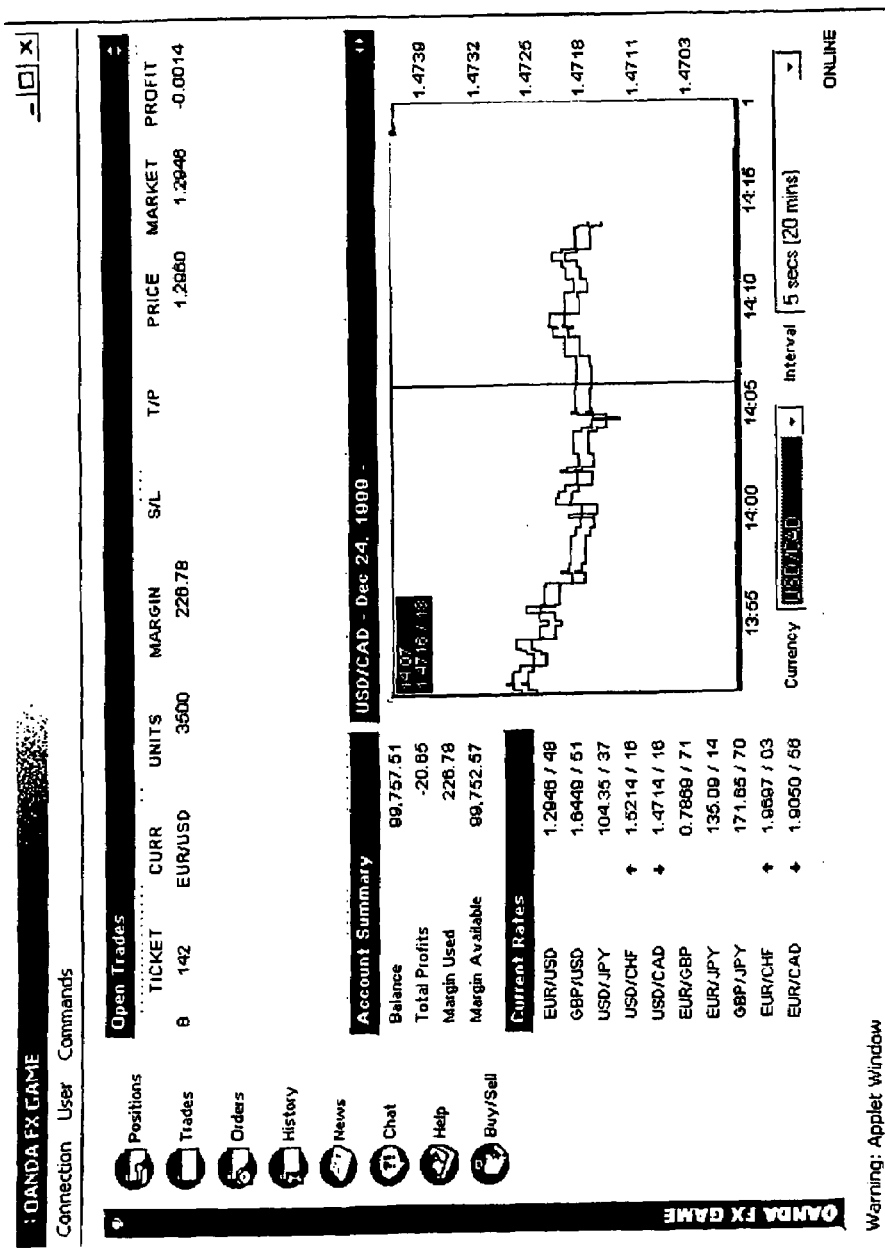
FIG. 2 depicts a graphical user interface of a preferred embodiment.
Figure 5:
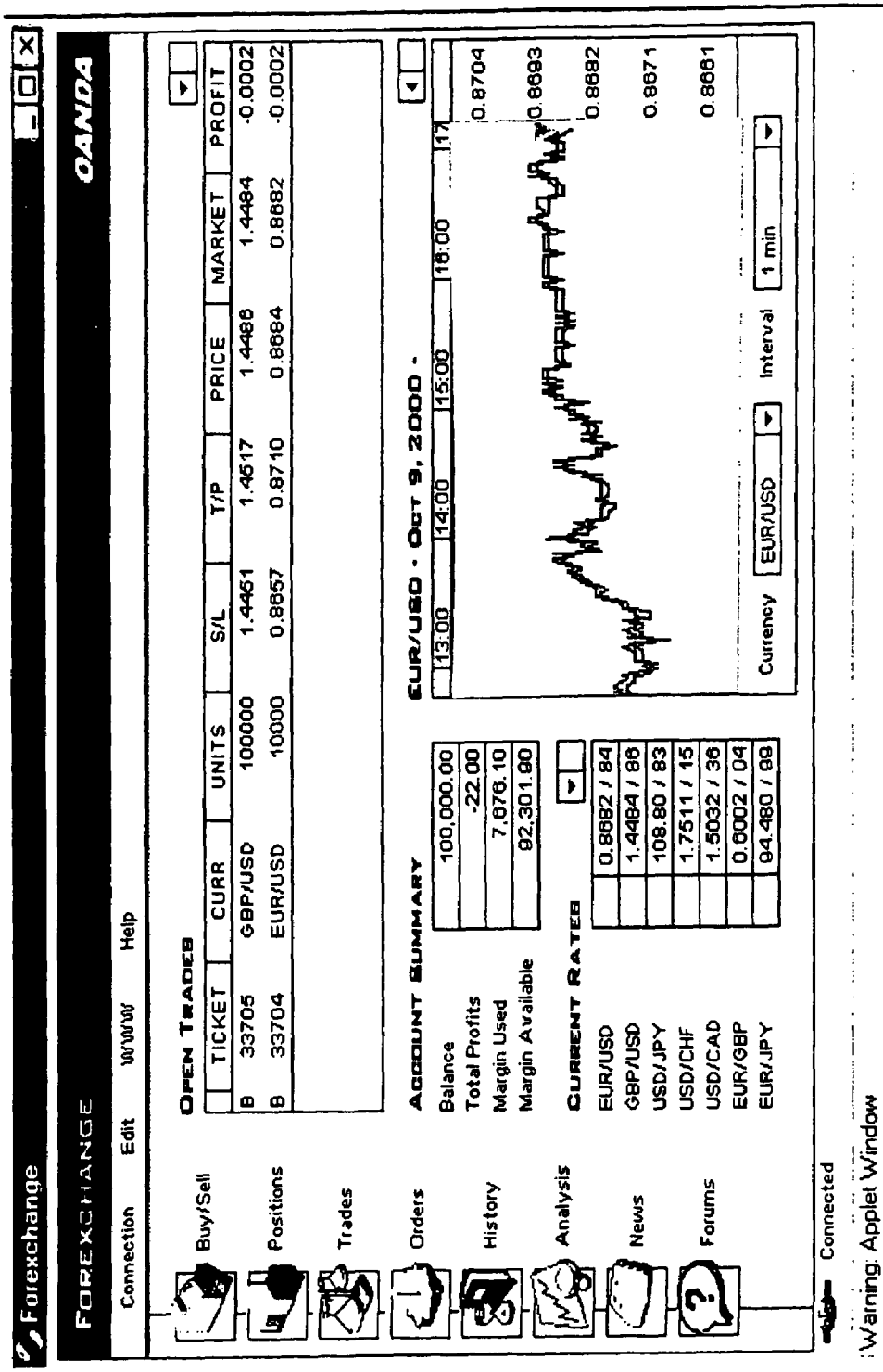
FIG. 5 depicts a graphical user interface of a preferred embodiment.

The end user interface to the Trading System is a Web page that can be displayed on any standard Java-enabled browser. The Web page (one version is shown in FIG. 2; a second, preferred version is shown in FIG. 5) depicts a summary of the trader's current position, recent trading activities, profit/loss performance of the portfolio, and a graphical display of recent past performance of the currencies the trader has positions in, as well as real-time exchange rates.

As discussed above, in a traditional on-line currency market a trade occurs through three steps: (1) a trader specifies a currency pair and an amount he would like to trade (and does not specify whether he would like to buy or sell); (2) a dealer provides both a bid and an ask price to the trader and gives the trader several seconds to respond (the dealer does not know whether the trader will buy, sell, or reject the offer); and (3) the trader either rejects the offer or accepts the offer and specifies whether he is buying or selling, within the response period set by the dealer.

In the Internet domain, this type of three-way handshake is problematic. The timing constraints are difficult to implement because of frequent delays in transmission over the Internet. To overcome this problem, the present invention uses a "two-way handshake," in which: (1) a trader specifies in her trade order: (a) a currency pair; (b) a desired amount to trade; (c) whether she wishes to buy or sell; and (optionally) (d) upper and lower limits on an acceptable exchange rate; and (2) a dealer (in this case, a preferred Trading System) executes the trade using the most current "market rates" (as calculated by the system). However, the system only executes the order if the calculated market rate lies above any specified lower limit and below any specified upper limit. Note that this method does not require the use of timing constraints, and thus avoids the Internet-implementation disadvantage of previous methods.

In the present invention, trades can be initiated by the trader at the push of a button. A trading request form pops up with fields properly initialized so as to minimize the number of keystrokes required. A trader may elect to execute a trade right away, in which case the buyer of a currency will buy at the current exchange rate market offer price. Conversely, a trader can sell a currency at the current bid price. A range of automatic trading options is available, including setting bid/offer prices with a certain duration and "all-or-nothing" rules. Furthermore, the trader can limit her risks by placing stop-loss orders that are executed automatically. Similarly, she can lock in profits, by issuing take-profit orders.

All communication between the trader's browser and the Trading System server occurs through the Internet, preferably using the strongest available encryption (e.g., 128 bit keys). Moreover, the trader must authenticate herself using private passwords or certification keys obtained from certification authorities, such as Verisign or Entrust.

A request for a market trade preferably proceeds as follows: the trader, at a push of a button, obtains a trade order ticket in a popup window on the browser with key fields pre-initialized (see FIG. 13). When the trade order is issued, again by the push of a button, a message is sent to a Trading System server, where the market price is calculated based on such factors as market data, size of the transaction, time of day, the Trading System's current exposure, and predictions on market direction. The trade order is executed using this market price. (The trader can specify limits, so that the trade occurs only if the price falls within these limits.) As such, the Trading System operates as a market maker. A message is then sent back to the trader with specific trade details, which is displayed in a popup window (see FIG. 14) on the trader's browser together with a transaction id (for future reference). Moreover, an open orders table (see FIG. 9) and current portfolio summary table (not shown) is updated to reflect the change.

Alternatively, the trader can issue in a similar manner an entry order (see FIG. 15) that requests a trade be made when the currency exchange rate reaches a specified threshold. The trader may specify how long the entry order will be valid.

Figure 15:
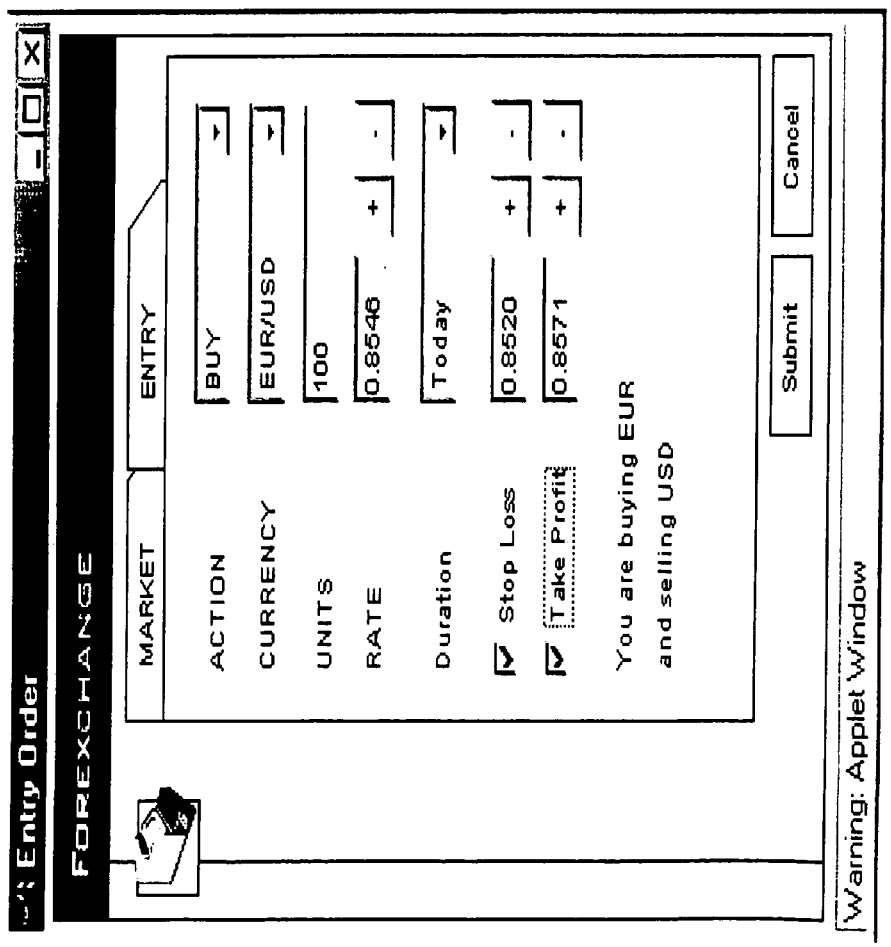
FIG. 15 depicts an entry order display.
Figure 16:
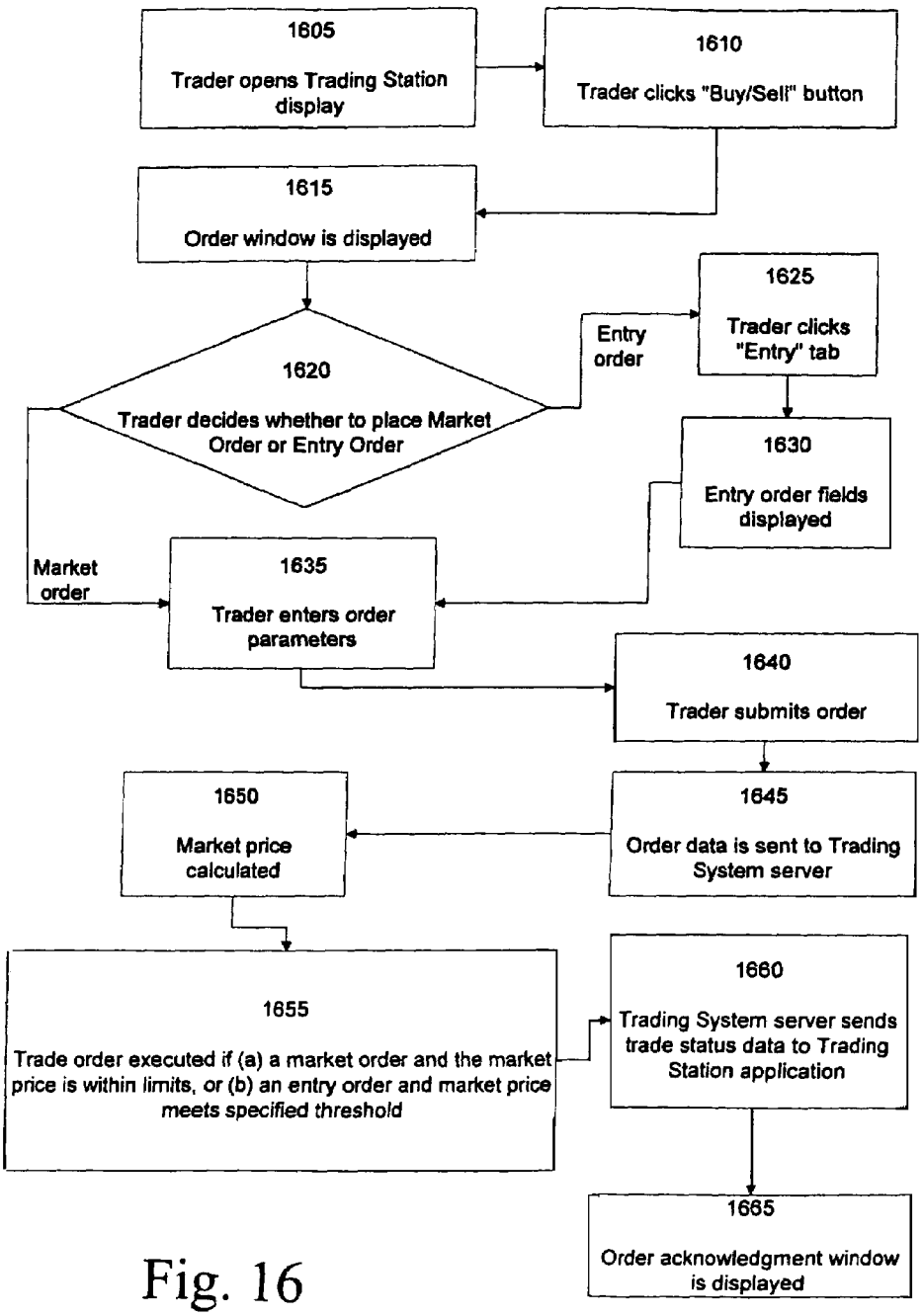
FIG. 16 depicts steps of a method of a preferred embodiment.

Referring to the attached figures, a preferred embodiment comprises a method of trading that in turn comprises the following steps (see FIG. 16): At step 1605, a trader desiring to trade opens a Trading Station display, and at step 1610 clicks a "Buy/Sell" button 510 on the Trading Station display (see FIG. 5). At step 1615 an order window is displayed (see FIG. 13). At step 1620 the trader decides whether to place a market order or an entry order. If a market order, then the trader proceeds to step 1635 and enters desired order parameters (as shown in FIG. 13). If an entry order, then the trader proceeds to step 1625 and clicks an "Entry" tab 1320 (see FIG. 13). At step 1630 entry order fields are displayed (see FIG. 15). Then the trader proceeds to step 1635 and enters desired order parameters (as shown in FIG. 15).

Once order parameters are entered at step 1635, the trader submits the order by clicking a "Submit" button 1310 (see FIG. 13) if the order is a market order, or clicking a "Submit" button 1510 (see FIG. 15) if the order is an entry order. At step 1645 data describing the order is sent by the Trading Station application to a Trading System server, where the data is stored. At step 1650 a current market price for the currency the trader desires to purchase is calculated. At step 1655 the trader's order is executed if (a) the trader's order is a market order and the calculated market price is within the limits set by the trader in the market order form at step 1635; or (b) order is an entry order and the calculated market price meets the threshold(s) specified in the Entry order form at step 1635.

At step 1660 the Trading System server sends trade status data to the trader's Trading Station application. This data includes an indication that the order has been executed, if that is the case, and at any rate includes an indication that the order has been received. At step 1665, the Trading Station application displays an order acknowledgment window (see FIG. 14) that displays order status information.

Over time, the Trading System will accumulate an imbalance in its currency portfolio and, at times, it will need to neutralize its risk exposure to adverse currency fluctuations. The Trading System Pricing Engine can influence its exposure by setting its price quotes accordingly. Moreover, it can close out its positions periodically or take hedging positions by executing larger trades through its Partners. Preferably the Trading System's positions are managed based on state-of-the-art trading models. Preferred trading models are described in U.S. patent application Ser. No. 09/855,633, filed May 14, 2001, the contents of which are incorporated herein by reference, as well as U.S. provisional application No. 60/274,174, filed Mar. 8, 2001.

The Trading System servers preferably operate 24 hours a day, 7 days a week. These servers interface with the traders over the Internet on the one hand and on the other hand with the Partner's back-office operations. Using standard, state-of-the-art database technology, it maintains the accounts of all traders and executes trades issued by the traders. The Trading System thus plays the role of a market maker in that it internally aggregates all trades and only occasionally balances its internal positions by trading larger sums through the Partner. These larger trades are issued to the Partner in an automated way. The Trading System also takes hedging positions so as to minimize risks on the unbalanced portions of the traders' account aggregates.

Partner's Role

The Partner maintains all actual funds. It is the source and target of all fund transfers to and from customers; it maintains the aggregate accounts; and it executes all trades issued automatically by the Trading System servers. From a legal point of view, all funds must be maintained in money market instruments. Hence, the Partner will maintain a Long and a Short money market fund for each currency supported.

Overview of Currency Trading System Server Internal Design

The Trading System server architecture is designed to be:

(1) modular, in order to: (a) simplify development (time-to-market); (b) easily allow extensions and modifications; (c) ensure correctness and robustness, and (d) keep it maintainable;

(2) efficient, in order to provide fast response times to online users and minimize the computational and networking resources required to support the service;

(3) scalable, in order to support (with suitable computing infrastructure) a large number of online users and high transaction volumes; and (4) fault resilient, so that any individual failure of a computing node or network connection does not interrupt service.

Figure 3:
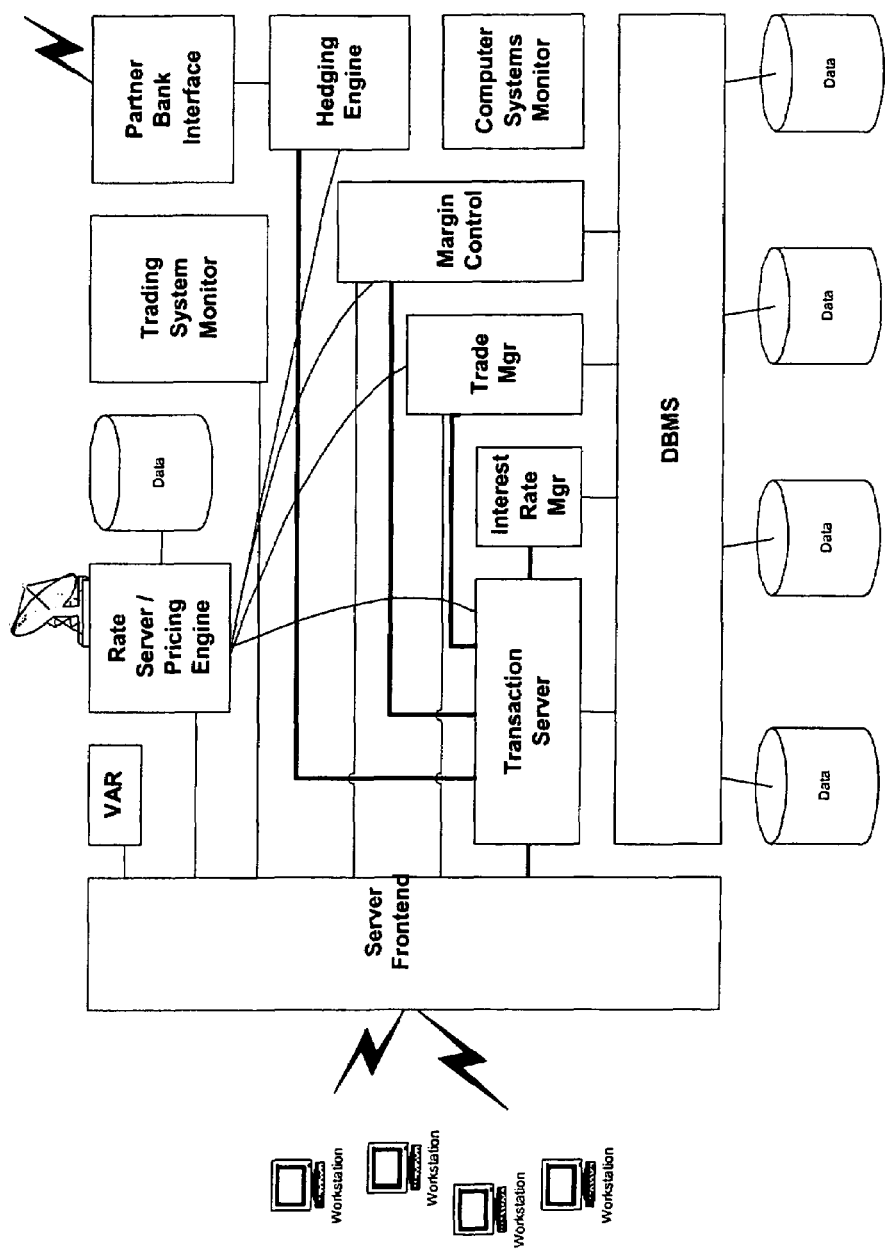
FIG. 3 depicts modules of a preferred trading system server.

The Trading System server software preferably runs exclusively on Unix platforms, and is composed of the following modules, each with a distinct set of responsibilities (see FIG. 3):

(1) Database (DBMS) 310. This is the heart of the server. It keeps track of customer profile information, all customer accounts and all transactions, and ensures that atomicity, consistency, independence, and durability ("ACID") properties are maintained. The database is the reference point for all information kept by the system.

The database is preferably a standard commercially-available SQL database, configured for full replication for reliability, availability, and improved performance. The preferred embodiment is based on IBM's DB-2 product line, but Oracle, for example, could also easily be used.

(2) Server Front-end 315. The server front-end 315 is responsible for all communication with the Web-based clients. It supports both persistent and non-persistent connections to the traders. The persistent connects are used primarily for periodic (i.e., every few seconds) transmission of the latest currency rates so that the traders can update the currency graphs and tables in real-time. Using persistent connections significantly reduces protocol processing overhead and reduces network bandwidth requirements. Non-persistent connections are used for all transaction-oriented requests, such as orders, transaction history requests, logins, etc. All transaction-oriented communication between the trader browsers and the Server Front-end occurs fully encrypted, while rate information is transmitted in unencrypted form for efficiency reasons.

Traders preferably communicate with the server using a request-response type of protocol. The Server Front-end 315 interprets each request it receives and, for each, takes appropriate action. For login requests, it sets up appropriate data structures so that all future requests can be serviced in the most efficient way. It also sets up encryption keys for secure communication, and logs the start of a new session with the Transaction Server. For rate requests, it returns the requested rates it obtains from the rate server. For orders, it executes the orders by issuing appropriate requests to the transaction server after checking the margin requirements, the availability of funds, and using rates as determined by the pricing engine. For stop-loss/take-profit and fixed-price orders (that may get executed in the future), the Trade Manager 365 is also informed. For each trade that gets executed, the Hedging Engine 340 and Margin Control 350 modules are informed, so that they always have an up-to-date snapshot of the state. For transaction history, the appropriate information is returned to the client after obtaining it from the Transaction Server 355.

The Server Front-end 315 also encapsulates a standard Web server (a la Apache), that services other trader requests that entail formatted text; this includes all of the Help pages, large transaction history requests, and server monitoring information. The Server Front-end 315 also acts as a Firewall.

Internally, the Server Front-end 315 is structured as a set of threads that service one request after another. The threads allow concurrent request servicing so that many requests can be serviced in parallel.

(3) Rate Server/Pricing Engine 325. The Rate Server obtains currency exchange rate information from a variety of external rate sources and stores it locally. The Pricing Engine computes the currency exchange rates that the traders see and that are used for trading. These are computed from the currency exchange rates obtained from the external rate sources, the directional movement and volatility of the market, the current Trading System exposure and a number of other parameters. The computed rates are made available to the other modules of the system, and are also stored on persistent media. Various methods of calculating such rates are known to those skilled in the art. A preferred method is described in U.S. patent application Ser. No. 09/764,366, filed Jan. 18, 2001, to Müller et al.

Traders can request historical rate data so that they can graphically display the movements of any pair of currencies. The Rate Server serves such requests and preferably has several years of currency exchange rates available for this purpose.

For fast response time, the Rate Server caches in memory all of the frequently and recently requested rates so as to minimize the number of disk accesses required.

(4) VAR (Value at Risk) Server 320. This server obtains and serves Value at Risk information. Various methods of calculating VAR are known in the art. A preferred method is disclosed in U.S. Provisional Patent Application No. 60/200,742, filed May 1, 2000, to Müller.

(5) Transaction Server 355. This server encapsulates all transaction functionality and communicates the transactions to the Database 310 server (which runs on a separate host) after validating the transactions. The Transaction Server 355 also updates all other modules that need to be informed of new transactions. Finally, the Transaction Server 355 informs the currently online traders when a transaction (that may have been issued by a stop-loss, take-profit, or limit order daemon or by the Margin Control Manager) takes place.

(6) Interest Rate Manager 360. The Interest Rate Manager 360 periodically (for example, every few minutes, every few seconds, or tick-by-tick) goes through all trader accounts to compute the interest rate due or owed based on the instruments currently in the portfolio, each resulting in a transaction of the trader account. The portfolio information is obtained through the Transaction Server 355. The interest rates used are obtained from external sources, and the history of interest rates are stored on persistent storage. Because real-time (or near real-time) information is used, the Interest Rate Manager is capable of calculating, paying out, and collecting interest by the second. Interest calculation formulas are known to those skilled in the art, and any appropriate formula can be used in the Interest Rate Manager without departing from the scope of the invention. An example is the formula $$A = P\left(1 + \frac{r}{m}\right)^{mt}$$

where P is the principal, r is the annual interest rate, t is the time (in years) over which interest is earned, m is the number of times per year that interest is compounded, and A is the amount owed (principal plus interest). The interest earned during time t is A−P. Thus, for example, if the annual interest rate is 3%, and the interest is compounded daily, then the interest $I_k$ earned over each time period $T_k = t_k - t_{k-1}$, where each $t_k$ is a clock-time (i.e., a particular day-hour-minute-second-fraction-of-a-second) to the nearest second (thus $T_k$ is in seconds), is calculated according to the formula $I_k = A_k - P_k$, where $P_k$ is the principal (the amount earning interest, not the "original" principal) at time $t_{k-1}$, and $$A_k = P_k\left(1 + \frac{0.03}{365}\right)^{\frac{365 T_k}{31,536,000}}.$$

Since there are 31,536,000 seconds per year, $$\frac{T_k}{31,536,000} \text{ is}$$

the time in years over which the interest is being calculated. Similar formulas can be used when $t_k$ is given to the nearest tenth, hundredth, or other fraction of a second. If interest is compounded continuously, those skilled in the art will recognize how to apply the well-known formula $A=Pe^{rt}$ appropriately. Thus, to calculate interest on a tick-by-tick basis, the above formulas can be used, with $T_k$ representing time between ticks.

(7) Trade Manager 365. The Trade Manager 365 continuously checks whether a trade should be executed on behalf of a trader, and if so executes the trade by interacting with the transaction server. The Trade Manager 365 consists of multiple subcomponents: (a) a stop-loss daemon continuously checks to see whether stop-loss orders should be executed and, if so, executes them through the Transaction Server 355; (b) a take-profit daemon continuously checks to see whether take-profit orders should be executed and, if so, executes them through the Transaction Server 355; and (c) a limit-order daemon continuously checks to see whether a limit order should be executed and, if so, executes it through the Transaction Server 355.

The daemons continuously monitor the current rates to determine whether action is required. Moreover, each of the daemons caches in memory all of the orders that it may need to execute. They keep the orders suitably sorted so that they can take fast action when necessary; for example, the stop-loss daemon sorts the orders in descending order of stop-loss price, the take-profit in ascending order of take-profit price.

(8) Margin Control Manager 350. This module continuously monitors the margin requirements of all trader accounts. When necessary, the Margin Control Manager 350 will liquidate some (or all) of a trader's holdings. It caches in memory all of the information necessary for this computation, sorted in decreasing order of risk, so that it can take swift action when necessary. Holdings are liquidated through the Transaction Server 355, when necessary.

(9) Trading System Monitor 330. This module continuously monitors the current state of the Trading System. Among others, state parameters include: (a) current Trading System currency positions; (b) current margin situation; (c) a summary of stop-loss, take-profit, and limit orders that exist; (d) the number of currently online users; (e) the number, size and type of trades executed per second; and (f) a summary of the account positions held by the users.

This information is made available (a) to the Pricing Engine 325 (where it is used to set the currency exchange rates made available to the traders), (b) to the Hedging Engine 340 so that it can determine when to issue trades with the Partner Bankend Bank, and (c) to system operators and Trading System financial engineers in real time via a feature-rich Web interface. Moreover, this information is logged on persistent storage for later, off-line analysis.

(10) Hedging Engine 340. This module continuously monitors current Trading System currency positions, the positions held in the trader accounts, recent trading activity, and the market direction and volatility to determine when to issue a trade with the backend Partner Bank. Various methods of performing such calculations are known to those skilled in the art. The Hedging Engine 340 preferably uses the hedging tool described in U.S. patent application Ser. No. 09/764,366, filed Jan. 18, 2001, to Müller et al., the contents of which are incorporated herein by reference.

(11) Partner Bank Interface 335. This module communicates directly with the backend Partner Bank to issue trades and obtain account information.

(12) Computer Systems Monitor 345. This module continuously monitors the operation and state of the computer systems on which the Trading System is running. Besides error conditions, such metrics as memory, processor, disk, and network utilization; paging activity; the number of packets sent over the various networks; the number of transactions; and the number of processes and threads are of interest. This information is made available to system operators in real time via a feature-rich Web interface and local consoles. In addition, it is stored on persistent storage for later, off-line analysis.

The Server modules described above are structured so that they can run independently as separate processes that can be independently mapped onto an arbitrary computer within a cluster. Moreover, each of the modules can run in replicated form, providing both fault tolerance and increased throughput.

Preferred Physical Organization of the Trading System Server

Figure 4:
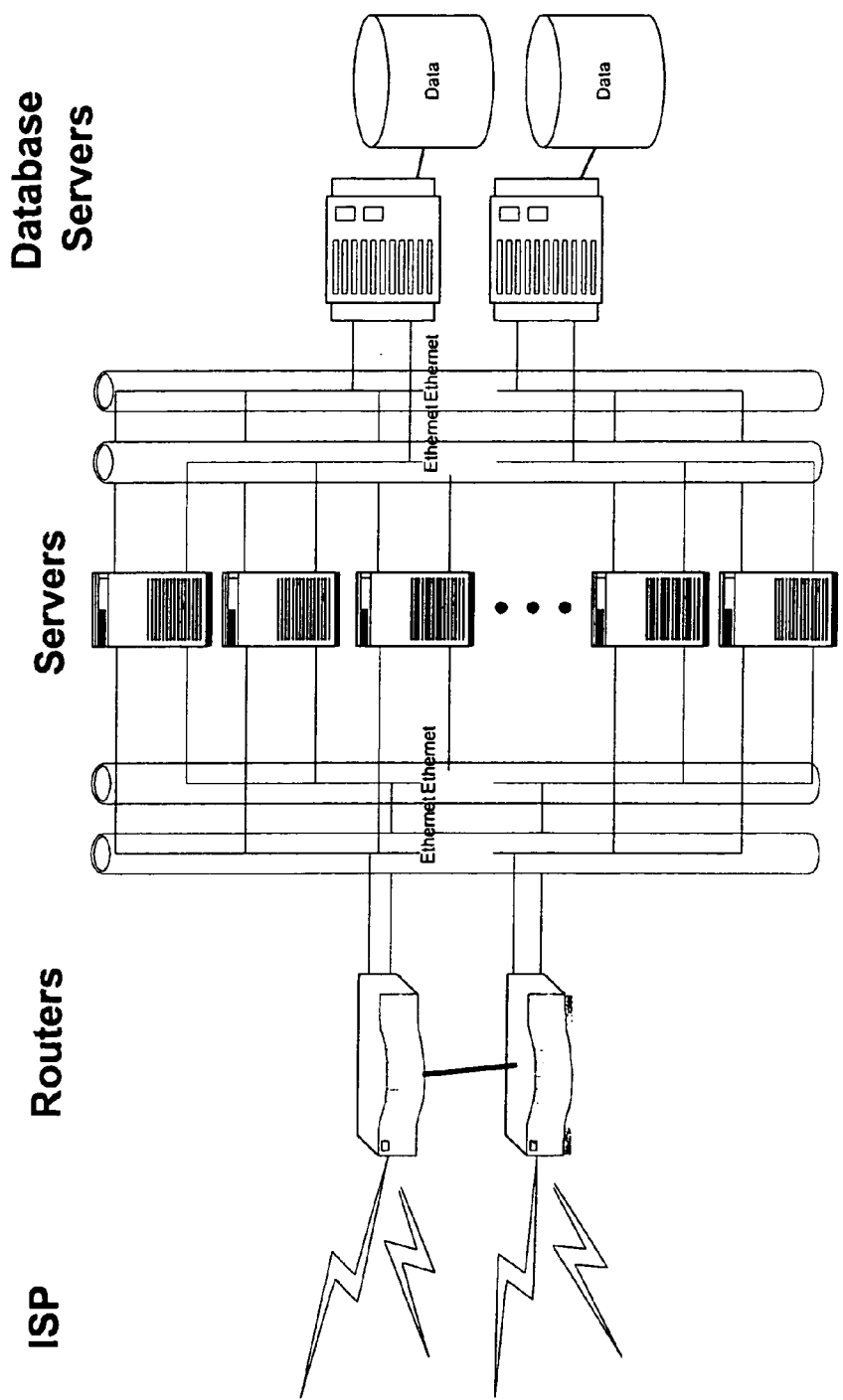
FIG. 4 depicts hardware components of a preferred embodiment.

A Trading System Server of a preferred embodiment runs on a hardware base consisting of a cluster of hosts and disk farms connected by networks. All of the hardware components are preferably replicated for fault tolerance, as depicted in FIG. 4.

The cluster is connected to multiple ISPs so that if one ISP goes down, traders can still communicate with the server. The ISPs are connected to the Server through a pair of routers 410 that monitor each other; if one of them goes down, then the other will automatically take over.

For security reasons, the Database 310 is on a separate back-end network; this way, it is not connected directly to the Internet and can only be accessed by the Transaction Server 355. The Database 310 is setup in a dual configuration, so that the system can continue operating with a single database failure. All disks are mirrored, again, so that any single disk failure will not result in a loss of data.

All of the other server processes run on a cluster of servers 420, connected to the Internet routers 410 on the one side, and connected to the backend database 430 on the other side. A virtually unlimited number of servers can be used in the cluster, allowing the system to scale up to support a large number of users. The servers can be partitioned by functionality, allowing specialized servers to be used, optimized for the particular functionality. For example, the Rate Servers 325 need minimal CPU power, and only a limited amount of memory. They also can be replicated easily without the introduction of any complexity or overhead. Hence, smaller, less costly hardware can be used for this purpose.

After login, traders typically communicate with a particular server in "sessions" for performance reasons. Using sessions improves cache locality, resulting in far fewer database accesses, and it allows the cost of creating session encryption keys to be amortized over many communication actions. For load balancing purposes, the trader software is directed to henceforth communicate with the least loaded server at the time when the trader first logs in. In case of severe load imbalances, individual traders are redirected to new, less loaded servers. If any of the servers crashes, then the client software that was communicating with the crashed server will detect the failure and automatically (transparently to the user) go through a new login procedure.

User Interface Description

Overview

The following is a description of a preferred user interface of a preferred Trading System. The main user interface display is called a "Trading Station," and it is used for all interactions with the trading system by a trader, such as analyzing changes in currency exchange rates, reviewing the trader's current currency positions, reviewing the trader's past transactions, or issuing buy and sell requests. The key features of the Trading Station are that: (1) it runs on any of the popular Web browsers connected to the Internet; (2) it displays continuously updated currency exchange rates in real-time; (3) it displays all pertinent information in one window; and (4) all interaction with the server occurs over fully-encrypted Internet connections.

System Requirements

The User Interface is preferably implemented in Java so as to run on any browser with JDK1.2 support, which includes all Netscape Navigators versions 4.2 and up as well as Microsoft's Internet Explorer versions 5.0 and up. The Trading Station is preferably supported for Windows 95, Windows 98, Windows 2000, Windows NT, Linux, Sun Solaris, and other Unix-based operating systems.

If operated from behind a firewall, then the Trading Station may operate properly only if the firewall allows HTTP requests to Port 90. Many corporations have firewalls that restrict access to the corporate network to well-known services such as email. Typically this restriction is accomplished by restricting the ports that may be used. For example, Port 80 is typically used for http (Web-based) traffic. Some firewalls inspect traffic going through Port 80 to ensure that the port is being used only for Web-based traffic. This is problematic for trading systems that do not use http messages—it causes users behind corporate firewalls to be inaccessible. However, a preferred embodiment of the present invention overcomes this obstacle by prefacing Trading System messages with standard http headers to make them appear to be http requests and responses, even though they are not.

Log In Procedure

In order to log in, a trader must be a registered user. Registering is preferably free and can be accomplished by clicking on a "new users" link on a login page. Logging in requires a user to provide a user-ID and password. If a trader forgets her password, she can click on the "forgot your password" link and fill in the information requested; her password will be then be emailed to her.

If user-ID and password are entered correctly, a small window appears indicating that the Trading Station is being loaded. After a short time, a larger window appears with the Trading Station Graphical User Interface shown in FIG. 5. Once the Trading Station is properly loaded, the contents of the small window is changed to include a number of useful links. It is important that this small window not be closed while the Trading Station is to remain in operation, although it may be minimized so as not to be in the trader's way. (This small window is necessary due to the limitations of typical Java implementations on most browsers that would otherwise not allow a trader to continue browsing the Web while the User Interface is active.)

Main Window of Trading Station

The Trading Station user interface is shown in FIG. 5. It can be resized to a convenient size, by using the standard resizing mechanisms supported by the trader's operating system's windowing system.

The Trading Station is preferably partitioned into a number of components that each serve a different purpose:

(A) Action buttons: a vertical panel located on the left hand side of the Trading Station contains a set of action buttons that allow a user to perform the most common operations.

(B) Menus: a set of pull-down menus across the top allows a user to invoke additional operations.

(C) Account summary: an area in the middle of the Trading Station that gives a summary of the user's account.

(D) Table: an area located across the top of the Trading Station that is used to display various information in tabular format. The information displayed depends on the most recently clicked Action Button. It might display currently held instruments, current open positions, or a history of recent transactions.

(E) Currency rates: an area at the bottom left that displays various currency rates. These rates are continuously updated in real time.

(F) Graph: located at the bottom-right corner, graphs display currency rates over time. The graphs are also updated in real-time as new rates become available.

Subsequent sections describe each of these components in detail.

Action Buttons

The Trading Station preferably has the following action buttons in a panel on the left side. Clicking the appropriate button will invoke the described operation:

Buy/Sell: Pops up a Buy/Sell window, from which a trader can issue trade requests. (See the description of the buy/sell window (FIG. 13) for more information.)

Positions: Displays the currently open positions in a table. (See the description of the Open Positions Table (FIG. 8) for the contents of the table.)

Trades: Displays the currently open trades in a table. (See the description of the Open Trades Table (FIG. 7) for the contents of the table.)

Orders: Displays the open orders (that may be executed some time in the future) in a table. (See the description of the Open Orders Table (FIG. 9) for the contents of the table.)

History: Displays a recent history of the trader's transactions in the table. (See the description of the History Table (FIG. 10) for contents of the table.)

Analysis: Pops up a new browser window with access to a number of analysis tools that might help in making trading decisions.

News: Pops up a new browser window with the latest currency news.

Forums: Pops up a new browser window with access to a number of forums (sometimes known as newsgroups) that allow a trader to participate in discussions with other traders and currency trading experts.

Pull-down Menus

There are preferably 5 pull-down menus (not shown), each offering different operations or services:

Connection Menu: (1) Disconnect: disconnects the Trading Station from the Trading System server. The Trading Station will remain open, but currency rates will no longer be updated, and transactions will not be possible. (2) Connect: connect the Trading Station to the server, so the trader is back on line. (3) Quit: quit and exit this application.

Account Menu: (1) Transaction history: pop up a new browser window to display an extensive list of all transactions that occurred on a trader's account. See the Transaction History section (relating to FIG. 10) for a description of what is displayed. (2) Clear account balance and P/L: for those who have incurred large losses on their account, this operation allows a trader to start over again with a cleared P/L and new funds in the account. This feature is primarily useful when an account on the Trading System is used as a game—i.e., no real money changes hands. (3) Add funds to account: for a game account, add funds to the account for a real money-account, transfer money into the account from the trader's credit card or obtain instructions on how to wire transfer money into the trader's account. (4) Buy/Sell: issue a trade or market order (see FIG. 13). (5) Open positions: display the open positions in a table (see FIG. 8). (6) Open trades: display all open trades in a table (see FIG. 7). (7) Open orders: display all open orders in a table (see FIG. 9). (8) Recent transaction history: display the most recent transactions in a table (see FIG. 10).

Commands Menu: (1) Change passwords. (2) Graph: specify the currency pair to be displayed in the graph.

Information Menu: (1) Interest rates: display interest rate information in a separate browser window. (2) Market News: display up-to-date currency market news in a separate browser window. (3) Analysis tools: use an analysis tool in a separate window. (4) Forum: participate in various forums related to currency trading. (5) Rankings: see a list of the most successful currency traders using the Trading System.

Help Menu: (1) Documentation: links to descriptive documents. (2) About: display software version number and credits. (3) Debug: display debugging information in a new window.

Account Summary

The account summary display (see FIG. 6 for an example) is a small table that provides a summary of the trader's account status. It preferably shows: (1) Account Balance: the amount of the trader's cash holding in the trader's account. (2) Realized P/L: the amount of profit or loss the trader has incurred with the trader's trading activity to date. (3) Unrealized P/L: the amount of profit or loss that the trader holds with the trader's current open positions. If the trader clears all of his open positions, then this amount would be added to the Realized P/L amount. (4) Margin Used: the amount of the trader's account balance and unrealized P/L tied up for margin purposes. (5) Margin Available: the amount of the trader's account balance and unrealized P/L available as margin for new trading transactions.

This information is preferably continuously updated in real-time to take current market conditions into account. Moreover, the information is always shown in the trader's home currency.

Tables

The table area of the Trading Station shows different information depending on the last Action Button-selected. It can include: (1) open trades; (2) open positions; (3) open orders; and (4) transaction history. The default is open positions.

How the information in the table is displayed can be controlled in two ways: (1) Scroll bars are used to scroll the table up or down, allowing a trader to see information that is hidden from view. (2) Sorting can be achieved by clicking on a column header, which causes the table to be sorted so that the column is in increasing or decreasing order. Clicking once sorts the column in increasing order; clicking again sorts it in decreasing order.

For all tables except Transaction history, clicking on a row of the table will cause a pop-up window to appear, offering further actions for that open trade, position, or order.

Open Trades Table

The open trades table (see FIG. 7) shows a list of the trader's currently open trades. The table preferably has 9 columns, described from left to right (not all are depicted in FIG. 7):

(1) Short/Long: Indicates whether the position is short or long.

(2) Ticket Number: a number that uniquely identifies an open trade. A trader can use this number as a reference for inquiries to the Trading System or its operators, or to search for particular entries in the transaction history table.

(3) Currency pair: the pair of currencies involved in this trade. The first currency of the pair is referred to as the base currency, while the second one is referred to as the quote currency.

(4) Units: the number of transacted units for this trade, expressed in the base currency.

(5) S/L: the trader's stop-loss for this trade. This trade will be closed automatically as soon as the currency exchange rate for this currency pair crosses the S/L value. A stop-loss limit is used to limit the loss a trader may incur with this trade.

(6) T/P: the trader's take-profit for this trade. This trade will be closed automatically as soon as the currency exchange rate for this currency pair crosses the T/P value. A take-profit limit is used to realize the trader's profit as soon as it reaches the T/P value.

(7) Rate: the exchange rate obtained when the trade got executed.

(8) Market: the current exchange rate for this currency pair.

(9) Profit: the unrealized profit (when positive) or loss (when negative) expressed in base currency and on a per unit basis.

Clicking on the scroll buttons will cause the table to scroll up or down. Clicking on a column header will sort the table so that the contents of the column are displayed in increasing or decreasing order. Clicking on a row with an open trade will cause a pop-up window to appear offering two operations: (1) Close trade. (2) Modify trade. This is used to modify the S/L or the T/P limits.

Open Positions Table

The Open Positions Table (see FIG. 8) displays a list of the trader's open positions. It is similar to the Open Trades table, except that all trades of the same currency pair are aggregated into one line.

The table preferably has 6 columns, described from left to right (not all are shown in FIG. 8):

(1) Short/Long: Indicates whether the position is short or long.

(2) Currency pair: the pair of currencies the position refers to. The first currency of the pair is referred to as the base currency, while the second one is referred to as the quote currency.

(3) Units: the number of units held in this position, expressed in the base currency.

(4) Rate: the average exchange rate obtained for the trades in this position.

(5) Market: the current exchange rate for this currency pair.

(6) Profit: the unrealized profit (when positive) or loss (when negative) expressed in base currency and on a per unit basis.

Clicking on the scroll buttons will cause the table to scroll up or down. Clicking on a column header will sort the table so that the contents of the column displayed in increasing or decreasing order. Clicking on a row with an open position will cause a pop-up window to appear offering the option to close the position.

Open Orders Table

The Open Orders Table (see FIG. 9) shows a list of the trader's currently open orders. An open order is a request that a particular trade should be made automatically when the exchange rate of the specified currency pair crosses a specified threshold.

The table preferably has 9 columns, described from left to right (not all are shown in FIG. 9).

(1) Short/Long: indicates whether the position is short or long.

(2) Order ID: a number that uniquely identifies the order. A trader can use this number as a reference for inquiries to the Trading System.

(3) Currency pair: the pair of currencies to be traded.

(4) Units: the number of units to be traded, expressed in the base currency.

(5) S/L: the stop-loss for this trade. This trade, once executed, will be closed automatically as soon as the currency exchange rate for this currency pair crosses the S/L value. A stop-loss limit is used to limit the loss a trader may incur with this trade.

(6) T/P: the trader's take-profit for this trade. This trade, once executed, will be closed automatically as soon as the currency exchange rate for this currency pair crosses the T/P value. A take-profit limit is used to realize the trader's profit as soon as it reaches the T/P value.

(7) Rate: specifies that the trade should be executed as soon as the exchange rate for the specified currency pair crosses this value.

(8) Market: the current exchange rate for this currency pair.

(9) Duration: specifies the amount of time an order should stand, until it is automatically canceled.

Clicking on the scroll buttons will cause the table to scroll up or down. Clicking on a column header will sort the table so that the contents of the column are displayed in increasing or decreasing order. Clicking on a row with an order will cause a pop-up window to appear offering two operations: (1) Cancel order. (2) Modify order. This is used to modify the exchange rate threshold at which the trade is to be executed, or the S/L or T/P limits.

Transactions Table

The Transactions (or Transaction History) Table (see FIG. 10) shows a list of the most recent transactions on the account. For access to a full list of past transactions, a user selects the Information pull-down menu and then selects Transaction History.

The Transaction History Table preferably has 6 columns, described from left to right:

(1) Transaction ID: uniquely identifies the transaction.

(2) Type: identifies the type of transaction.

(3) Currency pair: the pair of currencies associated with the transaction.

(4) Units: the number of units to traded in the transaction, expressed in the base currency.

(5) Price: the currency exchange rate applied when buying or selling a currency pair.

(6) Date/Time: the date and time of the transaction.

Clicking on the scroll buttons will cause the table to scroll up or down. Clicking on a column header will sort the table so that the contents of the column are displayed in increasing or decreasing order.

Currency Rates

The Currency Rates Table (see FIG. 11) shows the current exchange rate for the currency pairs supported by the Trading System. They are preferably updated in real time, approximately every 5 seconds. When there is a significant exchange rate movement for a currency pair, up/down indicators show the direction of the rate change in order to alert a trader, should a trader not currently have the currency pair displayed in the graph.

Clicking on the scroll buttons will cause the table to scroll up or down. Clicking on a currency pair's ask price will pop up a buy window for that currency pair. Clicking on a currency pair's bid price will pop up a sell window for that currency pair.

Graphs

Figure 12:
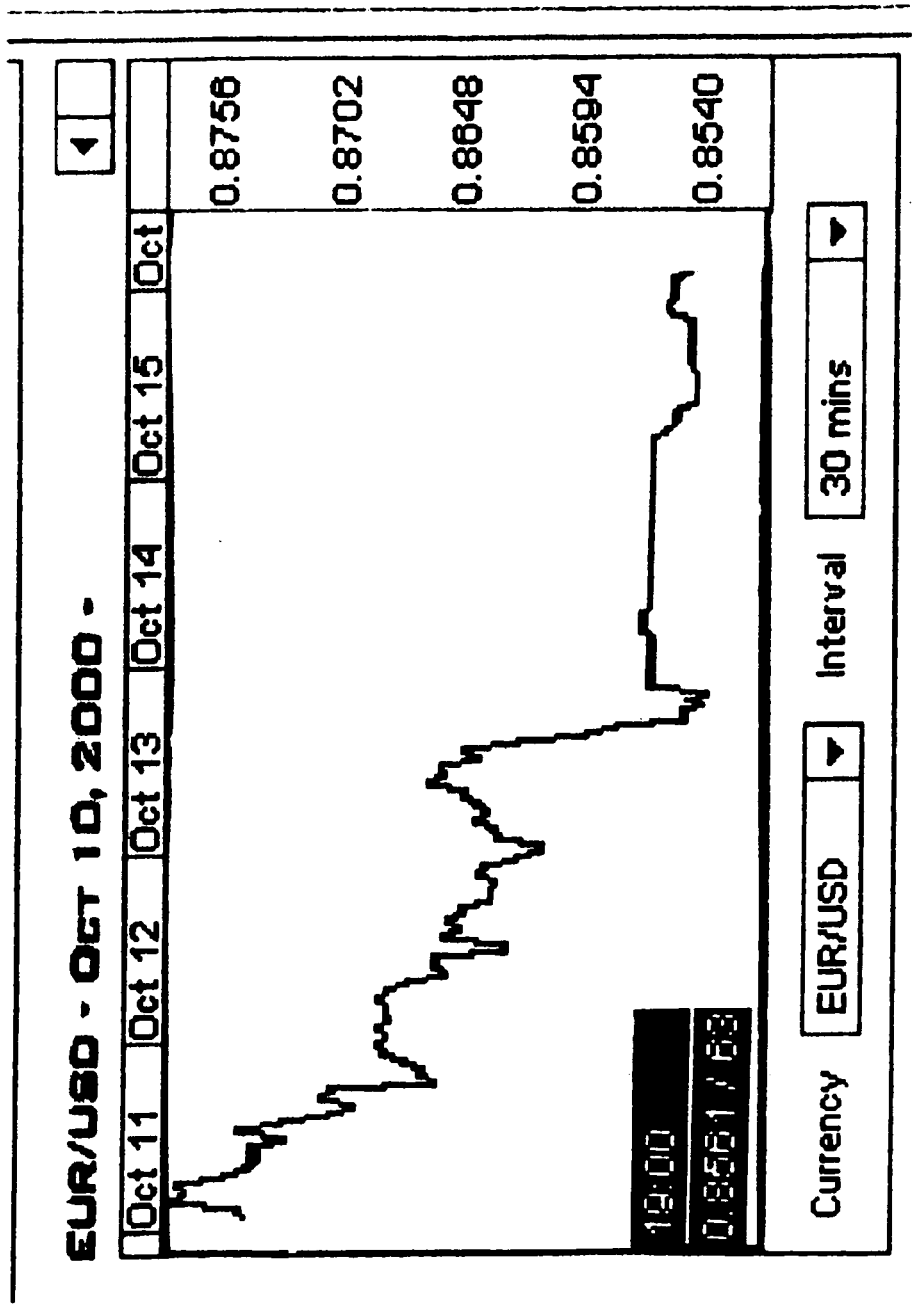
FIG. 12 depicts a currency exchange rate graph display.

Graphs (see FIG. 12) show how currency exchange rates change over a period of time, ranging from minutes to months. All graphs are updated in real-time, as new currency rates arrive.

At any given time, the difference between the lower boundary and the upper boundary of the curve represents the difference between the bid and the ask price, and the difference may vary over time depending on market conditions. Thus, the top part of the curve indicates the ask price, and the bottom of the curve indicates the bid price.

As a mouse cursor 1220 is moved over the graph, a sub-area 1230 in the graph shows precise exchange rate information for the target currency pair corresponding to the time instance represented by the position of the mouse cursor.

The graph may also display Buy or Sell widgets that indicate at which point in time a trader bought or sold a currency pair. Downward pointing red arrows indicate a sold currency pair (where a trader is hoping the rates will go down after that point), and upward pointing green arrows indicate a bought currency pair (where a trader is hoping the rates will go up after that point).

A trader can adjust what is shown in the graph: (1) The currency pair displayed is selected using the pull-down menu 1240 at the bottom left. (2) The granularity of the graph is selected using the pull-down menu 1250 at the bottom right of the graph. Selecting a fine granularity, such as 5 seconds (where each point on the horizontal axis represents 5 seconds of time), will display a relatively short time interval (less than an hour, in this case). Selecting a larger granularity, such as one day, will display longer-term trends (9 months of exchange rate information in this case).

Scroll buttons 1260 at the top right of the graph area allow a trader to shift the time interval shown to the left or to the right (backward or forward in time). Clicking on the graph with the mouse will hide the Buy/Sell widgets. Clicking again will cause them to reappear.

Buy/Sell Window

A Buy/Sell pop-up window (see FIG. 13) allows a trader to issue buy or sell orders. The window can be caused to pop up either by: (1) clicking on the Buy/Sell action button (see FIG. 5); (2) clicking on the bid or ask price in the Currency Rates Table (see FIG. 11); or (3) clicking on an existing trade, position, or order in the Table area of the Trading Station display (see FIG. 5).

Two types of orders are supported: (1) Market Orders are orders that are transacted immediately based on market exchange rates. (2) Entry Orders are orders that are executed when the exchange rate crosses a certain threshold.

Figure 13:
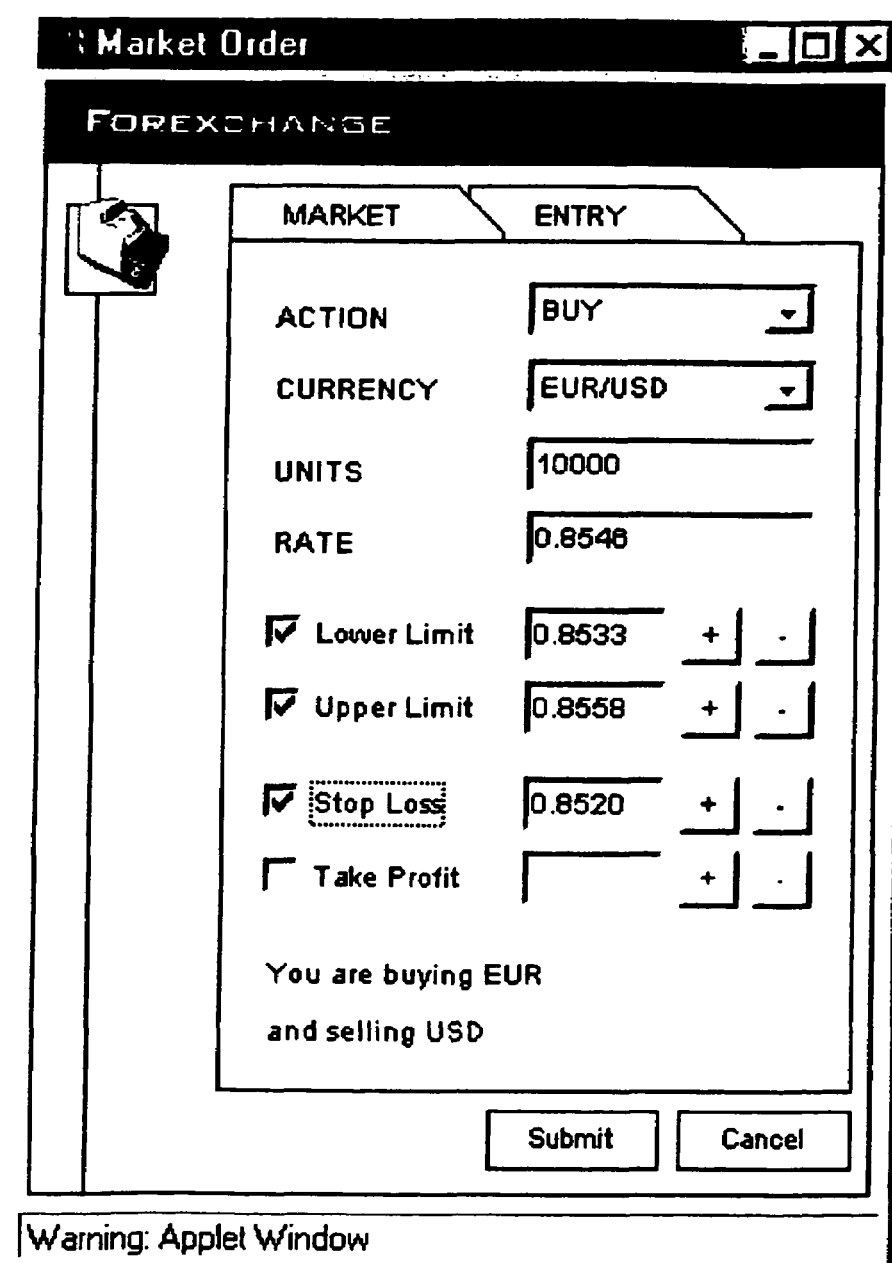
FIG. 13 depicts a buy/sell pop-up window display.
Figure 14:
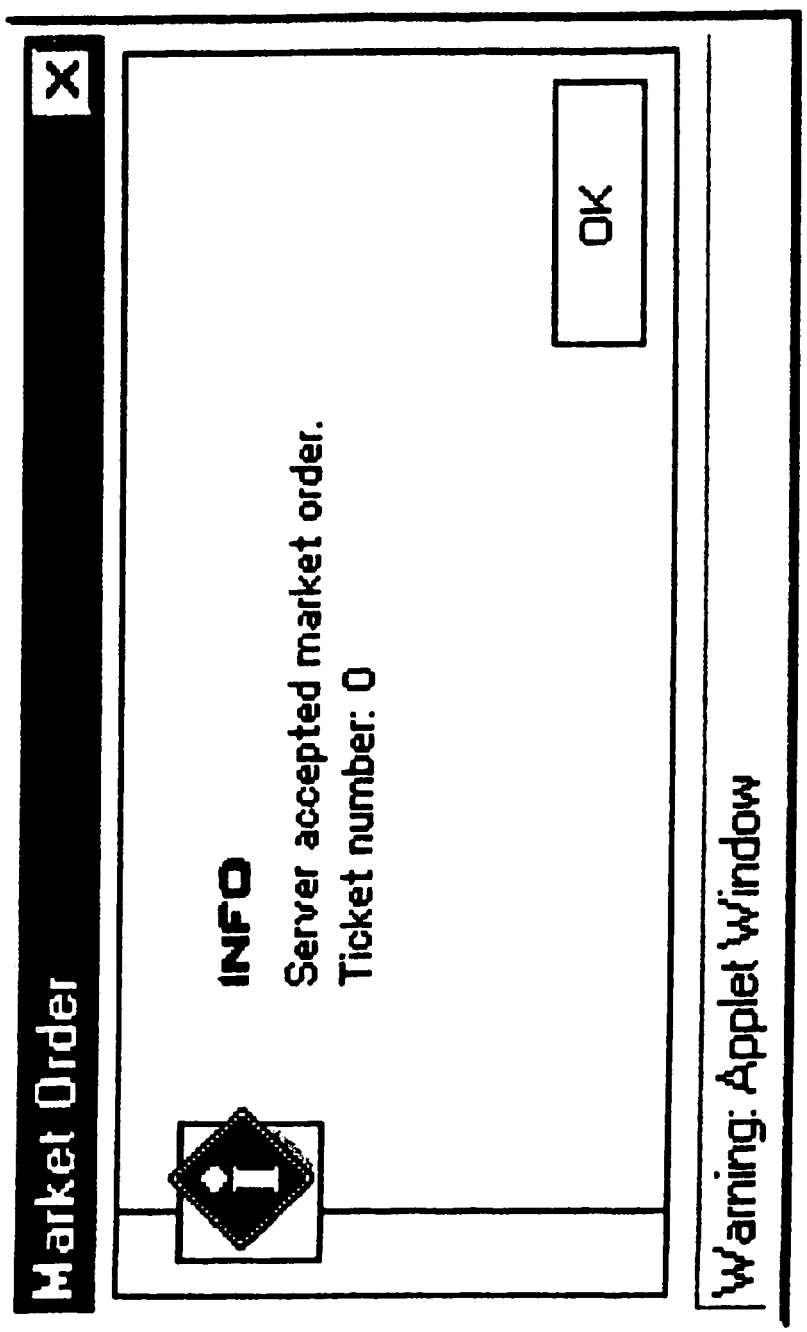
FIG. 14 depicts an acknowledgment window display.

The type of order can be selected by clicking on the appropriate tab in the Buy/Sell Window (see FIG. 13). Market order comes up as the default order.

Issuing a Market Order. To issue a market order with the Buy/Sell Window and the Market Tab selected, a number of fields must be filled out (although most of the fields are pre-initialized with reasonable values):

(1) ACTION: choose between buy and sell.

(2) CURRENCY: choose the currency pair the trader wishes to buy or sell. By default, this field will be initialized as follows: (A) If the Buy/Sell button was used to obtain the window, the currency pair currently shown in the graph. (B) If the bid or ask price was clicked to obtain the window, the currency pair for which the price was clicked. (C) If a trade or position was clicked in the Table area, the currency pair corresponding to the trade or position. The pull-down menu can be used to select another currency pair.

(3) UNITS: the number of units of the currency pair the trader wishes to buy or sell, with units expressed in terms of the base currency.

(4) Lower Limit: the order will result in a trade only if a price is obtained that does not lie below this limit. By default, no limit is selected, but one can be set by checking the check box. If the check box is checked, then the field is automatically initialized with a reasonable value; however the value can be changed either by modifying the number directly or by using the +/− buttons to increase or decrease the value, respectively.

(5) Upper Limit: the order will result in a trade only if a price is obtained that does not lie above this limit. By default, no limit is selected, but one can be set by checking the check box. If the check box is checked, then the field is automatically initialized with a reasonable value; however, the value can be changed either by modifying the number directly or by using the +/− buttons to increase or decrease the value, respectively.

(6) Stop Loss: if the order results in a trade, then the stop-loss value given will be associated with the trade. By default, no stop-loss limit is selected, but one can be set by checking the check box. If the check box is checked, then the field is automatically initialized with a reasonable value; however, the value can be changed either by modifying the number directly or by using the +/− buttons to increase or decrease the value, respectively.

(7) Take Profit: if the order results in a trade, then the stop-loss value given will be associated with the trade. By default, no take profit limit is selected, but one can be set by checking the check box. If the check box is checked, then the field is automatically initialized with a reasonable value; however, the value can be changed either by modifying the number directly or by using the +/− buttons to increase or decrease the value, respectively.

The RATE field is set by the Trading Station and corresponds to the most recent exchange rate for the selected currency pair.

To issue the order, a Submit button 1310 must be selected. If the order is successful, and a trade occurs, then an acknowledgment window (see FIG. 14) pops up with a Ticket number that can be used for future reference. Moreover, the Open Trades Table (see FIG. 7) will be updated to reflect the new trade, as will the Open Positions Table (see FIG. 8) and the Transaction History Table (see FIG. 10).

Several issues are important to note:

(1) If an order is successful and a trade occurs, then the exchange rate obtained for the trade will correspond to the most current exchange rate maintained at the Trading System servers and not necessarily the rate displayed in the Buy/Sell window.

(2) An order without Lower and Upper Limits will always result in a trade.

(3) An order with both Lower and Upper Limits will result in a trade if and only if the exchange rate for the potential trade lies between the two limits.

Issuing an Entry Order. To issue an entry order with the Buy/Sell Window and the Entry Tab selected (see FIG. 15), a number of fields must be filled out (although most of the fields are pre-initialized with reasonable values):

(1) ACTION: choose between buy and sell.

(2) CURRENCY: choose the currency pair the trader wishes to buy or sell. By default, this field will be initialized as follows: (A) if the Buy/Sell button was used to obtain the window, the currency pair currently shown in the graph; (B) if the bid or ask price was clicked to obtain the window, the currency pair for which the price was clicked. The pull-down menu can be used to select another currency pair.

(3) UNITS: the number of units of the currency pair the trader wishes to buy or sell, with units expressed in terms of the base currency.

(4) RATE: the order will result in a trade as soon as the exchange rate for the selected currency pair crosses the given value; that is, for buy orders, if the rate goes below this value, and for sell orders if the rate goes above the given value (5) Duration: this value is used to limit the amount of time an outstanding order will remain effective. By default, the order remains effective indefinitely. However, the duration can be set to the end of the day or for an hour.

(6) Stop Loss: if the order results in a trade, then the stop-loss value given will be associated with the trade. By default, no stop-loss limit is selected, but one can be set by checking the check box. If the check box is checked, then the field is automatically initialized with a reasonable value; however, the value can be changed either by modifying the number directly or by using the +/− buttons to increase or decrease the value, respectively.

(7) Take Profit: if the order results in a trade, then the stop-loss value given will be associated with the trade. By default, no take profit limit is selected, but one can be set by checking the check box. If the check box is checked, then the field is automatically initialized with a reasonable value; however, the value can be changed either by modifying the number directly or by using the +/− buttons to increase or decrease the value, respectively.

To issue the order, a Submit button 1510 must be selected. This results in an acknowledgment window (see FIG. 14) popping up with a Ticket number that can be used for future reference. Moreover, the Open Orders Table (see FIG. 9) will be updated to reflect the new order. Note that a trader can modify the parameters of an open order (including the rate representing the trade threshold, or the S/L and T/P) by clicking on the order in the Open Orders Table.

What is claimed is:

1. A system for trading currencies over a computer network, comprising:
    (a) a server front-end in communication with said computer network;
    (b) a database;
    (c) a transaction server in communication with said server front-end and with said database;
    (d) a rate server in communication with said server front-end; and
    (e) a pricing engine in communication with said rate server; and further comprising an interest rate manager in communication with said transaction server and said database, wherein said interest rate manager is operative to calculate, pay out, and collect interest on a tick-by-tick basis.

2. A system for trading currencies over a computer network, comprising:
    (a) a server front-end in communication with said computer network;
    (b) a database;
    (c) a transaction server in communication with said server front-end and with said database;
    (d) a rate server in communication with said server front-end; and
    (e) a pricing engine in communication with said rate server; and further comprising a trade manager in communication with said transaction server and said database, wherein said trade manager comprises a stop-loss daemon that (a) continuously checks whether stop-loss orders should be executed, and (b) if a stop-loss order should be executed, executes it through said transaction server.

3. A system for trading currencies over a computer network, comprising:
    (a) a server front-end in communication with said computer network;
    (b) a database;
    (c) a transaction server in communication with said server front-end and with said database;
    (d) a rate server in communication with said server front-end; and
    (e) a pricing engine in communication with said rate server; and further comprising a trade manager in communication with said transaction server and said database, wherein said trade manager comprises a take-profit daemon that (a) continuously checks whether take-profit orders should be executed, and (b)

if a take-profit order should be executed, executes it through said transaction server.

4. A system for trading currencies over a computer network, comprising:
(a) a server front-end in communication with said computer network;
(b) a database;
(c) a transaction server in communication with said server front-end and with said database;
(d) a rate server in communication with said server front-end; and
(e) a pricing engine in communication with said rate server; and further comprising a trade manager in communication with said transaction server and said database, wherein said trade manager comprises a limit-order daemon that (a) continuously checks whether limit orders should be executed, and (b) if a limit order should be executed, executes it through said transaction server.

5. A system for trading currencies over a computer network, comprising:
(a) a server front-end in communication with said computer network;
(b) a database;
(c) a transaction server in communication with said server front-end and with said database;
(d) a rate server in communication with said server front-end; and
(e) a pricing engine in communication with said rate server, wherein said pricing engine is operable to compute currency exchange rates based on: (a) data obtained from external rate sources; and (b) market directional movement and volatility.

6. A system as in claim 5, wherein said pricing engine is further operable to compute currency exchange rates based on positions held by said system.

7. A system for trading currencies over a computer network, comprising:
(a) a server front-end in communication with said computer network;
(b) a database;
(c) a transaction server in communication with said server front-end and with said database;
(d) a rate server in communication with said server front-end; and
(e) a pricing engine in communication with said rate server; further comprising a hedging engine in communication with said transaction server, wherein said hedging engine is operable to perform at least two of the following calculations: (a) calculate a total amount of home currency appearing in all open positions; (b) calculate an out-of-equilibrium exposure; (c) calculate a new potential net exposure; (d) calculate an equilibrium position; (e) calculate boundaries of possible exposures; (f) calculate values for a pair of quoting functions; and (g) calculate an average price and an average spread.

8. A system as in claim 6, wherein said positions are managed based on one or more trading models.

9. A system as in claim 8, wherein at least one of said one or more trading models comprises: (a) a price collector component; (b) a price filter component; (c) a price database component; (d) a gearing calculator component; (e) a deal acceptor component; and (f) a book-keeper component.

10. A system as in claim 8, wherein at least one of said one or more trading models comprises: (a) a price collector component; (b) a price filter component; (c) a price database component; (d) a gearing calculator component; (e) a deal acceptor component; (f) an opportunity catcher component; and (g) a book-keeper component.

11. A system for trading currencies over a computer network, comprising:
(a) a server front-end in communication with said computer network;
(b) a database;
(c) a transaction server in communication with said server front-end and with said database;
(d) a rate server in communication with said server front-end; and
(e) a pricing engine in communication with said rate server; further comprising a margin control manager in communication with said transaction server and said database, wherein said margin control manager is operable to monitor on a tick-by-tick basis margin requirements of accounts and on said tick-by-tick basis liquidate holdings as needed to maintain specified margins.

* * * * *